US010079037B2

(12) United States Patent
Mahnad

(10) Patent No.: US 10,079,037 B2
(45) Date of Patent: *Sep. 18, 2018

(54) QUADRATURE TRACK ERROR SIGNAL FOR OPTICAL RECORDING MEDIA AND DEVICES

(71) Applicant: Oracle International Corporation, Redwood Shores, CA (US)

(72) Inventor: Faramarz Mahnad, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,624

(22) Filed: May 19, 2017

(65) Prior Publication Data

US 2017/0256279 A1    Sep. 7, 2017

Related U.S. Application Data

(63) Continuation of application No. 14/090,240, filed on Nov. 26, 2013, now Pat. No. 9,734,859.

(51) Int. Cl.
*G11B 7/085*    (2006.01)
*G11B 7/095*    (2006.01)
*G11B 7/005*    (2006.01)

(52) U.S. Cl.
CPC .......... *G11B 7/08505* (2013.01); *G11B 7/095* (2013.01); *G11B 7/0053* (2013.01)

(58) Field of Classification Search
CPC ...... G11B 7/08505; G11B 7/095; G11B 7/005
See application file for complete search history.

(56) References Cited

U.S. PATENT DOCUMENTS 4,232,268 A * 11/1980 Hinn ...................... H03G 11/06
                                                          348/638
4,914,725 A *  4/1990 Belser .................. G05B 19/232
                                                          318/560
5,383,169 A      1/1995 Shinoda et al.
(Continued)

FOREIGN PATENT DOCUMENTS

CN        101359487 A    2/2009
CN        102693733 A    9/2012
(Continued)

*Primary Examiner* — Brenda C Bernardi
(74) *Attorney, Agent, or Firm* — Invoke

(57) ABSTRACT

A method for providing tracking error signals in an optical data storage system includes a step of receiving a wobble signal having a first frequency from the wobble detection system. The wobble detection system includes an optical pick up unit that detects positions of the head relative to lands and grooves. Characteristically, the wobble signal is amplitude modulated for positions intermediate between the land and the groove. The method further includes a step of receiving a primary tracking error signal from the wobble detection system. The wobble signal is multiplied with a synchronous signal to about a product signal. The product signal is positive for a first direction of motion and negative for a second direction of motion that is opposite that of the first direction. The product signal is integrated to obtain a quadrature track error signal.

20 Claims, 9 Drawing Sheets

(56) References Cited

U.S. PATENT DOCUMENTS

| | | | |
|---|---|---|---|
| 5,883,551 A * | 3/1999 | Marchesani | H04L 27/364 332/103 |
| 6,009,059 A | 12/1999 | Sasaoka | |
| 6,473,369 B1 | 10/2002 | Quan et al. | |
| 6,744,712 B2 * | 6/2004 | Hanks | G11B 7/0903 369/44.37 |
| 6,765,861 B2 * | 7/2004 | Van Vlerken | G11B 7/24082 369/275.4 |
| 6,937,542 B1 | 8/2005 | Ogawa | |
| 7,260,031 B2 * | 8/2007 | Kadlec | G11B 7/08517 369/44.28 |
| 8,054,715 B1 * | 11/2011 | Sutardja | G11B 7/08541 369/44.28 |
| 2006/0203631 A1 | 9/2006 | Wu et al. | |
| 2007/0203667 A1 * | 8/2007 | Watanabe | G01B 17/00 702/158 |
| 2007/0253293 A1 | 11/2007 | Buechler | |
| 2009/0109807 A1 | 4/2009 | Huang et al. | |

FOREIGN PATENT DOCUMENTS

| | | |
|---|---|---|
| CN | 103000192 A | 3/2013 |
| EP | 1551012 A1 | 7/2005 |
| JP | 01-223634 A | 9/1989 |
| JP | 05-012677 A | 1/1993 |
| JP | 2001-006182 A | 1/2001 |
| JP | 2005-346745 A | 12/2005 |
| JP | 2007-225500 A | 9/2007 |

* cited by examiner

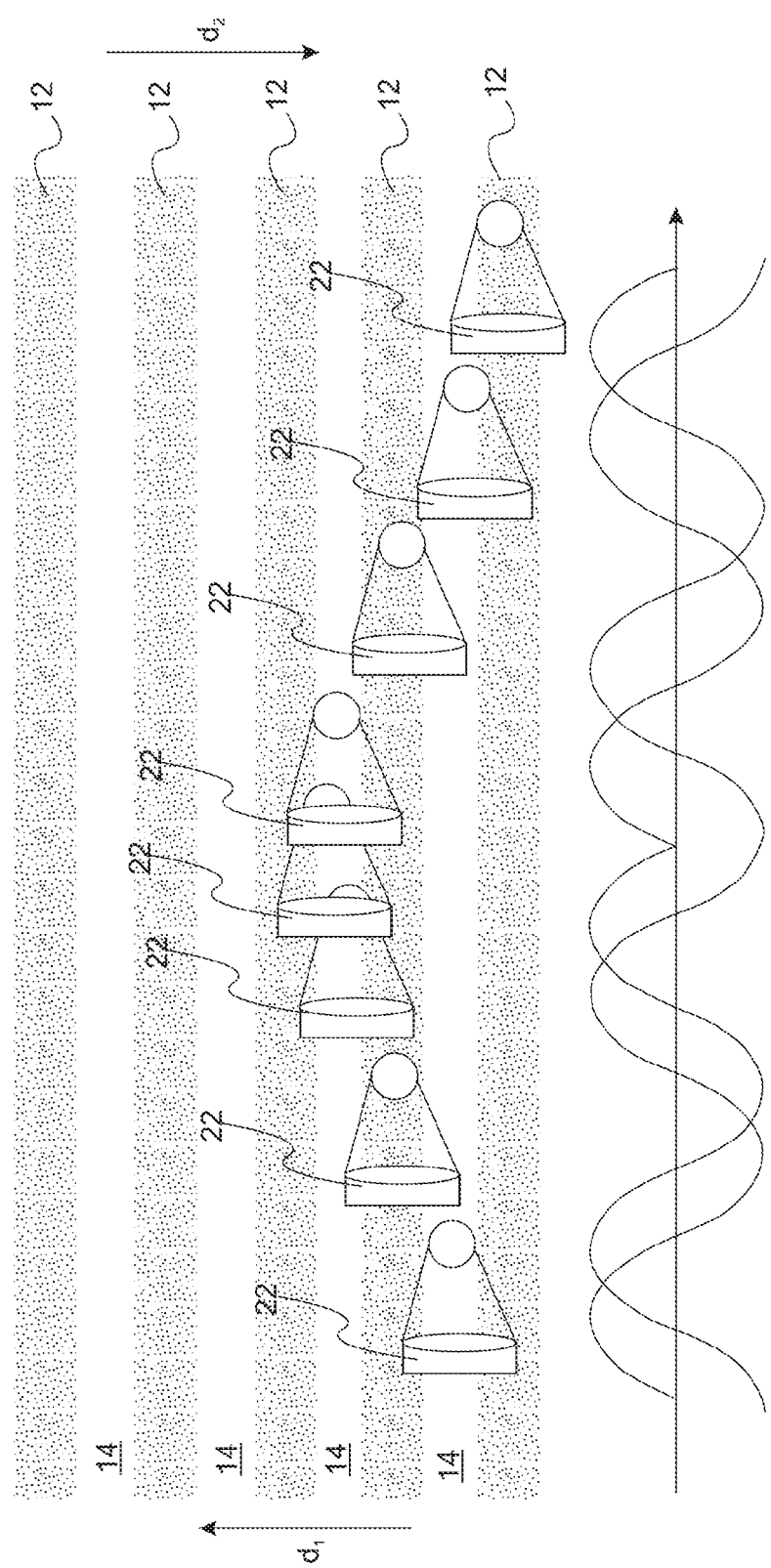

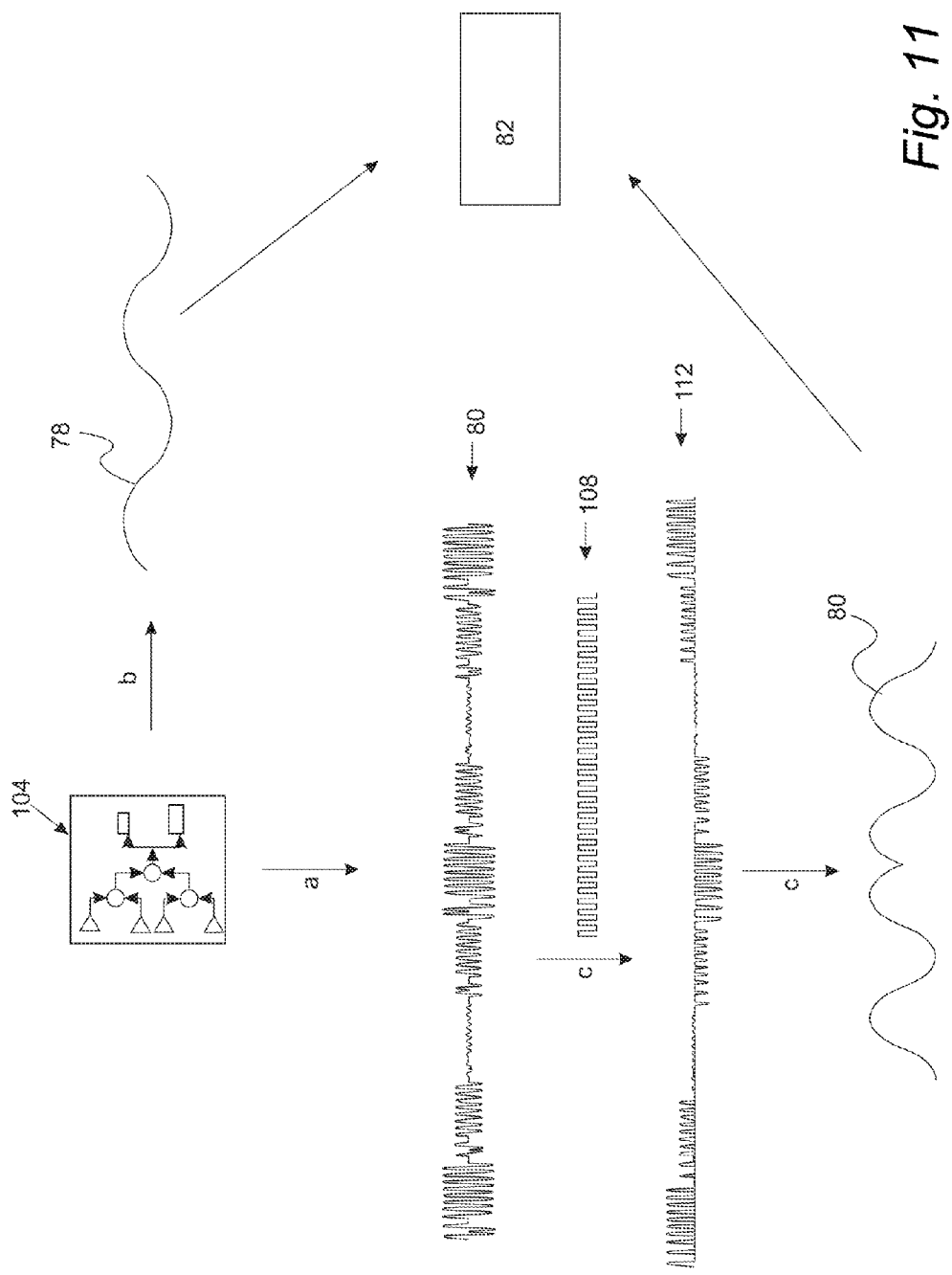

QUADRATURE TRACK ERROR SIGNAL FOR OPTICAL RECORDING MEDIA AND DEVICES

RELATED APPLICATIONS

This application is a continuation of U.S. patent application Ser. No. 14/090,240, filed on Nov. 26, 2013, entitled "QUADRATURE TRACK ERROR SIGNAL FOR OPTICAL RECORDING MEDIA AND DEVICES", which is hereby incorporated herein by reference in its entirety and for all purposes.

TECHNICAL FIELD

In at least one aspect, the present invention is related to methods and apparatuses for detecting the movement of transducer heads in optical storage systems.

BACKGROUND

Servo systems in optical data recording devices such as optical tape drives utilize tracking error signals, detected from the optical media via an optical pickup unit (OPU) device, to accurately record and then retrieve data on the optical media.

FIGS. 1 and 2 illustrate a portion of a typical optical recording medium. FIG. 1A is a top view while FIG. 1B is a side view. Optical recording media 10 includes a nanostructure surface relief pattern embossed on the surface of the optical medium. The nanostructure includes lands 12 and grooves 14 embossed in the Z direction (i.e., perpendicular to the face of optical recording medium 10) thereon in a preformatting process. These surface relief patterns are used to generate the tracking signals used by a servo system to track the position of an optical head reading or writing to the medium. An optical drive OPU with the aid electronic signal processing generates a tracking error signal (TES) from the detected patterns. In order to establish an addressing capability for these recording tracks, the edges of these embossed lands 12 and grooves 14 relief patterns are structurally modulated in the horizontal direction parallel to the face of optical recording medium 10 (e.g., Y axes to track X axes) with sinusoidal patterns 16 (i.e., wobbles) which contain individual track address codes. FIG. 1A also depicts recording marks 18 encoded thereon.

A technique referred to as "Radial Push Pull" Tracking signal generation (also referred to as "Main Push Pull" (MPP), has been conventionally used to generate the Tracking Error Signal (TES) for the rewritable optical recording media preformatted with "land" and "groove" track geometries as set forth above. This scheme generates a reference tracking signal based on the geometries of land and grooved tracks on the media and detectable by a main quad photodetector (QPD) of the OPU. FIG. 3 provides a schematic illustration of a typical signal processing scheme for the TES signal generated by the QPD. Signal processing system 20 includes recording/reading head 21. Recording/reading head 21 includes quad photodetector 22 which includes individual photodetectors 24, 26, 28, and 30. Signals 32, 34, 36, 38 from photodetectors 24, 26, 28, 30 are amplified by amplifiers 42, 44, 46, 48 to provide signals 52, 54, 56, 58. Signals 52, 54 are provided to adder 60 which outputs summed signal 62. Signals 56, 58 are provided to adder 64 which outputs summed signal 66. Summed signal 62 and summed signal 66 are inputted into subtractor circuit 70 with outputs difference signal 72 which is further processed to provide TES signal 78 and wobble signal 80. For example, low pass filter 82 receives difference signal 72 as an input and outputs TES signal 78, while band pass filter 84 receives difference signal 72 and outputs wobble signal 80. The high frequency wobble signal includes, among other information, the key data track ID and Address codes. Moreover, TES signal 78 and wobble signal 80 are used by recording/reading head servo system 86 to provide positioning information regarding the position of head 21. In particular, digital servo systems control the dynamic operation of the OPUs by using wobble signal information to place the OPU on the correct desired data track.

As depicted in FIG. 4, the Radial Push Pull method of TES derivation generates a quantized sinusoidal signal as the OPU 22 moves across multiple data track on the media 10 along direction $d_1$ while the medium is moving along direction $d_{tape}$. It is a well-known shortcoming that directional information is not provided by this method because of the quantized sinusoidal nature of the signal as depicted in FIG. 5. FIG. 5 demonstrates that movement first along direction $d_1$ and then along direction $d_2$ produces the same TES signal as movement only along direction $d_1$. This lack of direction information has a severe impact on the robust control of the tracking servo system especially during cross track OPU motion. It is significant that the TES signals from both FIGS. 4 and 5 do not show any difference as OPU motion changes direction.

Accordingly, there is a need for improved methods and apparatuses for detecting the direction of OPU motion.

SUMMARY

The present invention solves one or more problems of the prior art, by providing a method for providing tracking error signals in an optical data storage system. In particular, the method generates signals that provide directional information on the motion of Optical Pickup Units across data tracks in optical recording media The optical data storage system includes a head having a wobble detection system. The method includes a step of receiving a wobble signal having a first frequency from the wobble detection system. The wobble detection system includes an optical pick up unit that detects positions of the head relative to lands and grooves. The wobble signal for the optical pick up unit centered on a land is 180 degrees out of phase with the wobble signal for the optical pick up unit centered on a groove. Characteristically, the wobble signal is amplitude modulated for positions intermediate between the land and the groove. The method further includes a step of receiving a primary tracking error signal from the wobble detection system. The wobble signal is multiplied with a synchronous signal to about a product signal. The product signal is positive for a first direction of motion and negative for a second direction of motion that is opposite that of the first direction. The product signal is integrated to obtain a quadrature track error signal. Characteristically, the quadrature track error signal is 90 degrees out of phase with the primary track error signal. The quadrature track error signal and the primary track error signal in combination and individually provide direction information about movement of the tape head across the width of the tape.

In another embodiment, an apparatus for implementing the method set forth above is provided in which tracking error signals are provided in an optical storage system. The apparatus includes a transducer head having a wobble detection system. The wobble detection system includes an optical pick up unit that detects positions of the transducer head relative to lands and grooves and provides a wobble signal having a first frequency. The wobble signal for a land is amplitude modulated for positions intermediate between the land and the groove. A synchronous multiplier multiplies the wobble signal with a square wave signal having the first frequency to provide a product signal. The product signal is positive for a first direction of motion and negative for a second direction of motion that is opposite that of the first direction. An integrator integrates the product signal to obtain a quadrature track error signal. The quadrature track error signal being 90 degrees out of phase with the track error signal, the quadrature track error signal and the track error signal in combination provide direction information about movement of the transducer head across data tracks.

BRIEF DESCRIPTION OF THE DRAWINGS

Exemplary embodiments of the present invention will become more fully understood from the detailed description and the accompanying drawings, wherein:

FIG. 10 provides a schematic of an OPU crossing multiple tracks along two opposite transverse directions with the related TES signal and quadrature track error signal; and FIG. 11 provides a schematic flow chart of the method implemented by the system of FIG. 8 for detecting the quadrature track error signal.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 3:
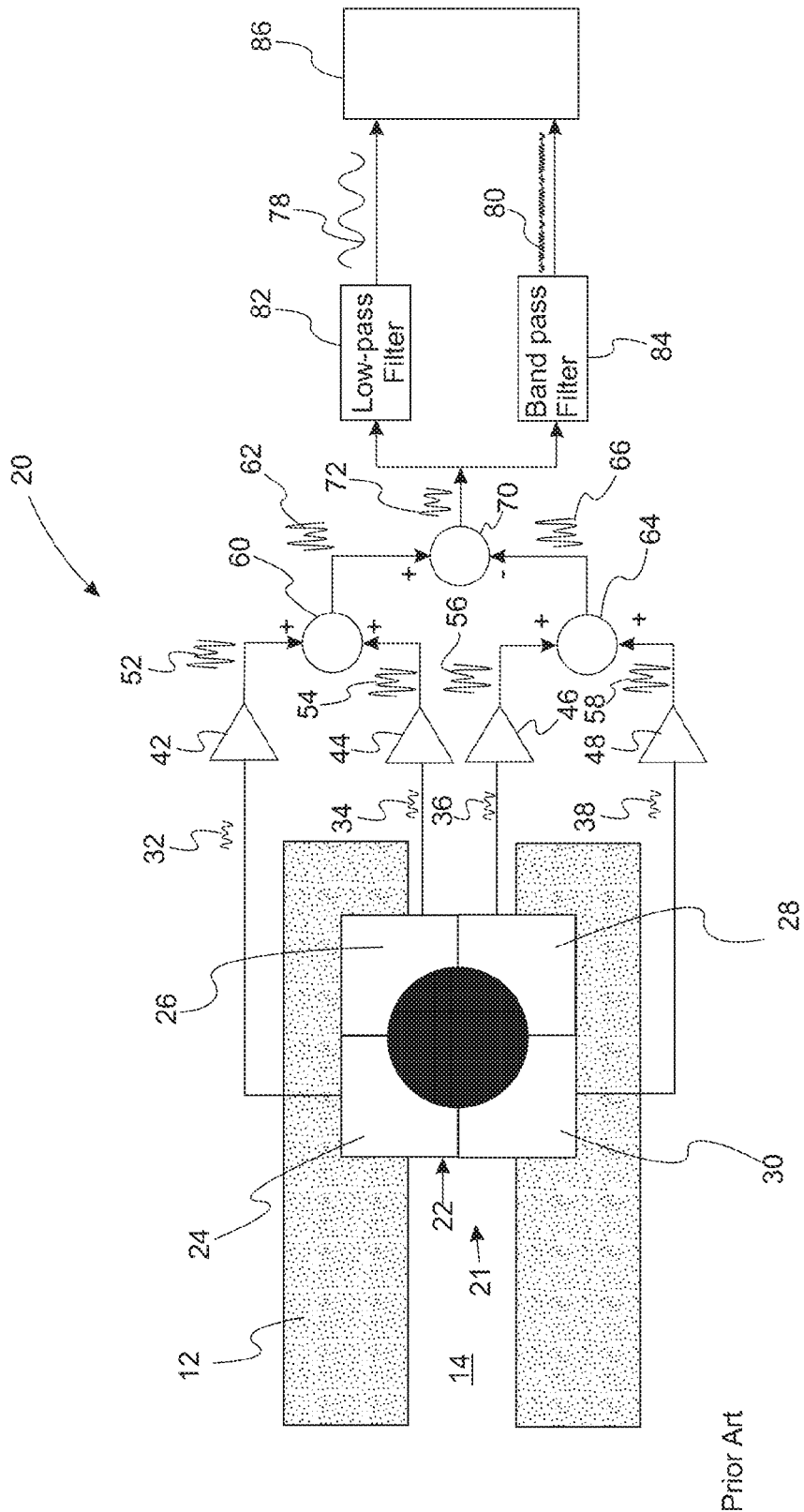
FIG. 3 provides a schematic illustration of a system for detecting a tracking error signal and a wobble signal from an optical storage medium having wobble patterns embossed thereon.
Figure 4:
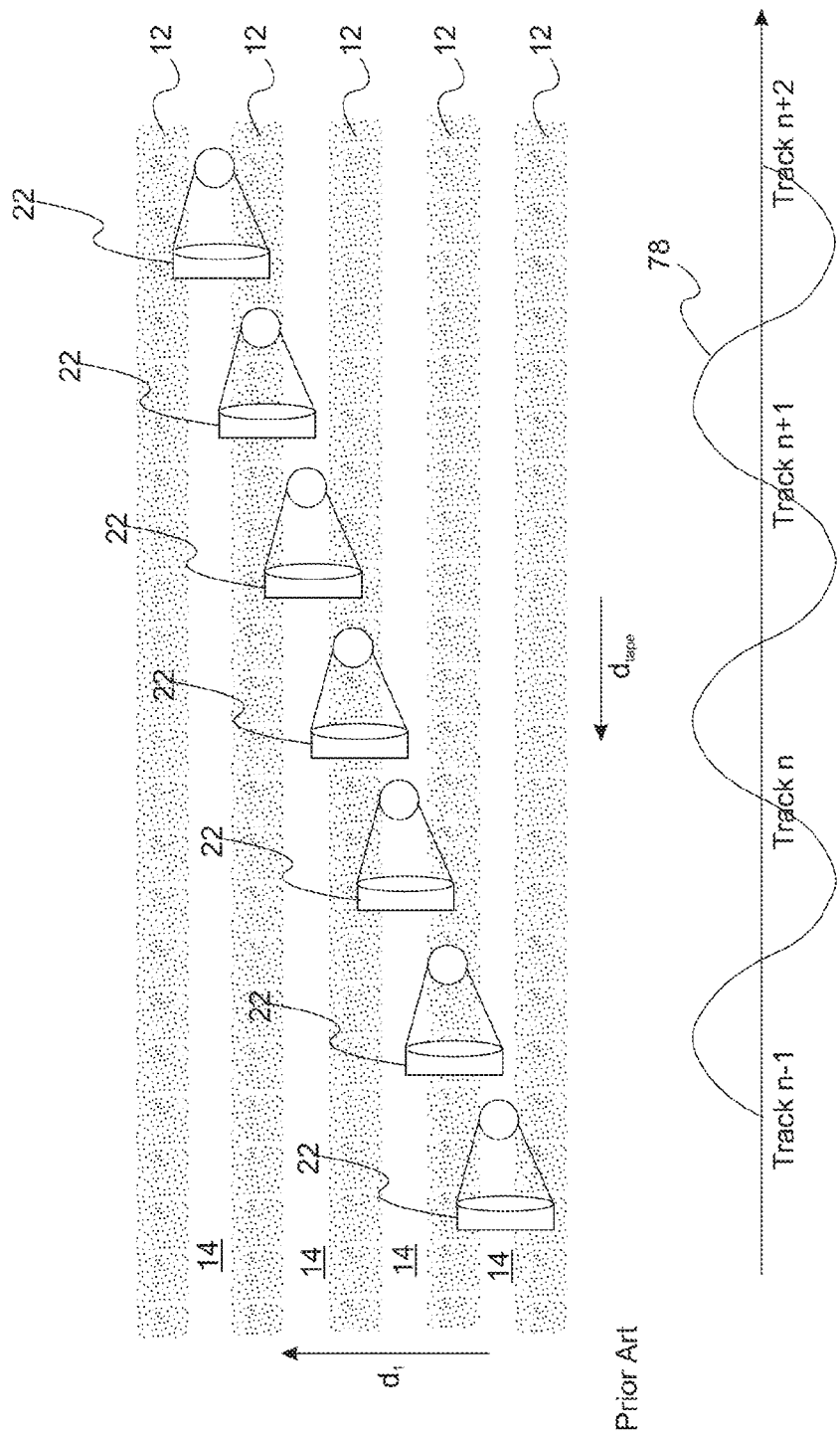
FIG. 4 provides a schematic of an OPU crossing multiple tracks with the related TES signal.
Figure 6A:
FIG. 6A provides an example of a wobble signal for an optical pickup unit centered on a groove.
Figure 6B:
FIG. 6B provides an example of a wobble signal for an optical pickup unit centered on a land.

Embodiments and variations of the invention, advantageously utilize wobble signal information from a digital data storage media to generate a novel complimentary Quadrature Track Error Signal (QTES) that provides the directions of OPU motion information. In this regard, a system such as that described by FIG. 3 is utilized to provide a wobble signal. Methods for detecting wobble signals and/or Tracking Error Signals are set forth in U.S. Pat. Nos. 5,383,169; 6,009,059; and 6,937,542; the entire disclosures of which are hereby incorporated by reference. Advantageously, the QTES signal allows robust control of OPU motion by allowing in combination detection of the movement of the recording head. FIG. 6A provides an example of a wobble signal obtained when the OPU is centered on a groove while FIG. 6B provides an example of a wobble signal when the OPU is centered on a land. As set forth above, the wobble signals are the result of the wobbled edge structure of the grooved tracks at very high spatial frequency with narrow high frequency band passing filtering of MPP.

Figure 5:
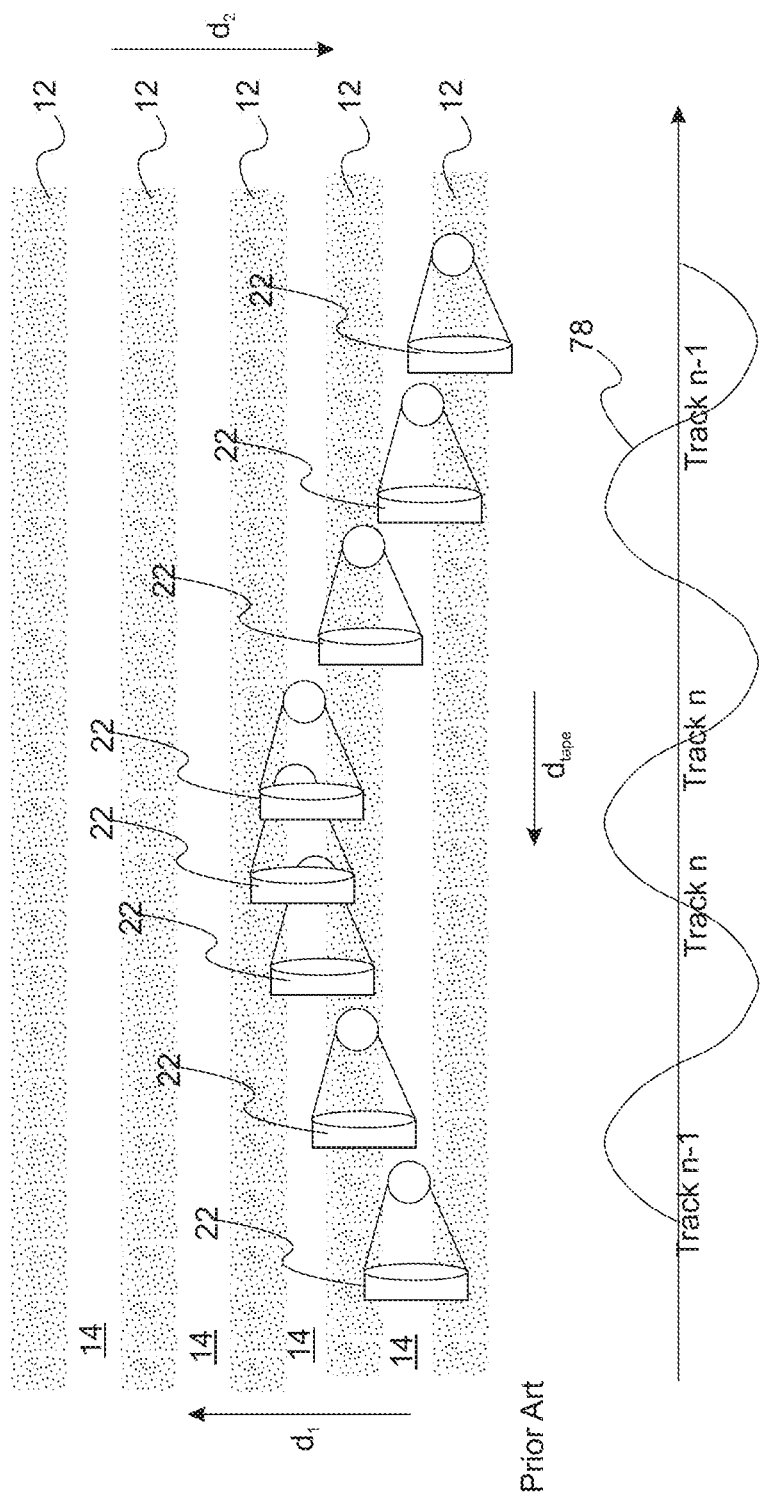
FIG. 5 provides a schematic of an OPU crossing multiple tracks along two opposite transverse directions with the related TES signal.
Figure 7:
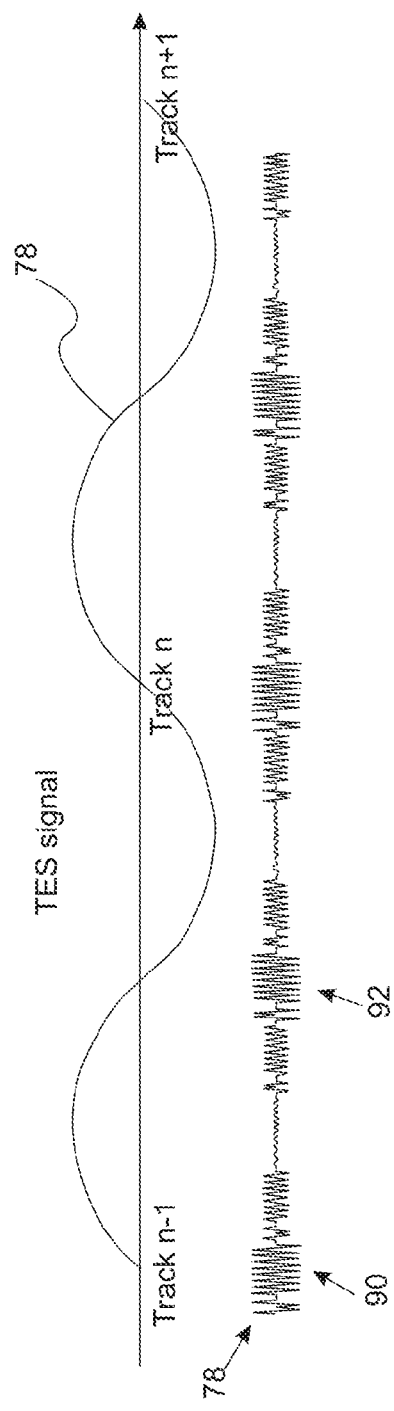
FIG. 7 provides a schematic showing the evolution of a wobble signal as the OPU moves across a storage medium.

With reference to FIGS. 5 and 7, schematics illustrating the amplitude modulation of the wobble signal as a read/write head moves across data tracks are provided. FIG. 7 provides a schematic showing the evolution of a wobble signal as OPU 22 moves across the data tracks of optical storage medium 10. Due to the properties of the diffraction pattern generated by the land and groove media surface structure, the polarity of the wobble signals changes as OPU 22 moves along direction $d_1$ and medium 10 moves along direction $d_{tape}$. When OPU is placed over groove 14 at track n, the wobble signal is described by item number 90. As the OPU moves toward track n+1, the wobble signal amplitude modulates until the OPU is centered on a land, at which point the wobble signal is described by item number 92. At intermediate position, the amplitude of wobble signal 78 has an intermediate value.

Figure 1:
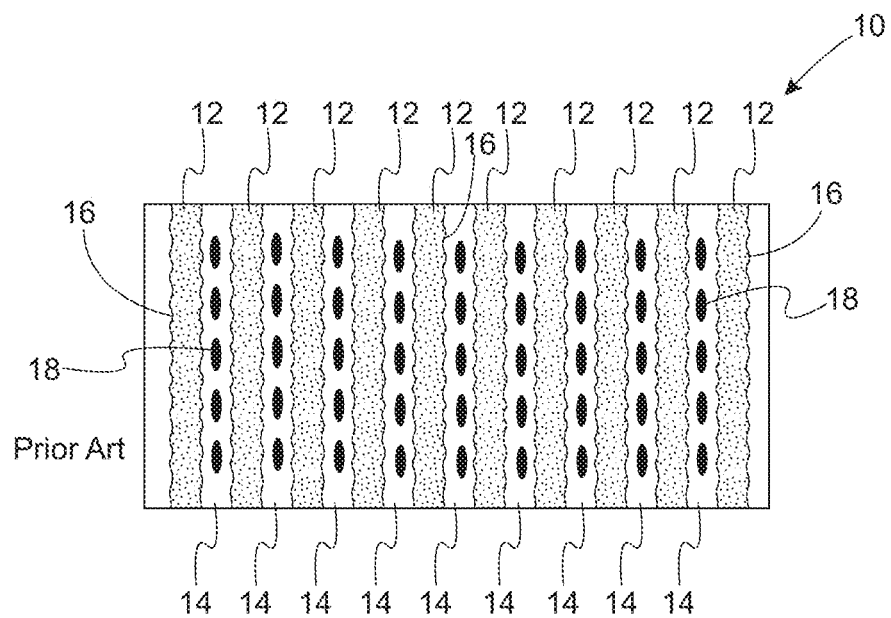
FIG. 1 provides a top view of optical recording media showing the embossed lands and grooves.
Figure 2:
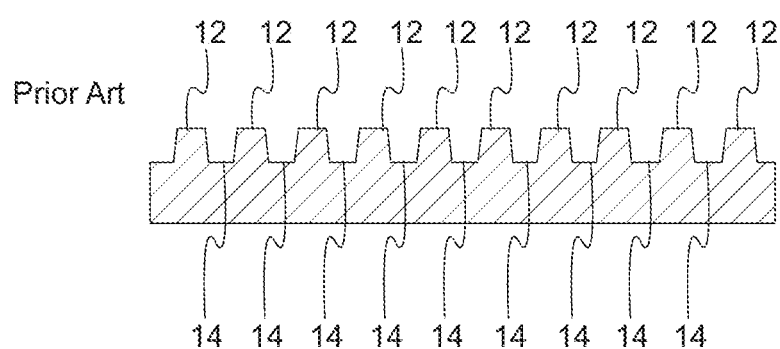
FIG. 2 provides a side view of optical recording media showing the embossed lands and grooves.
Figure 8:
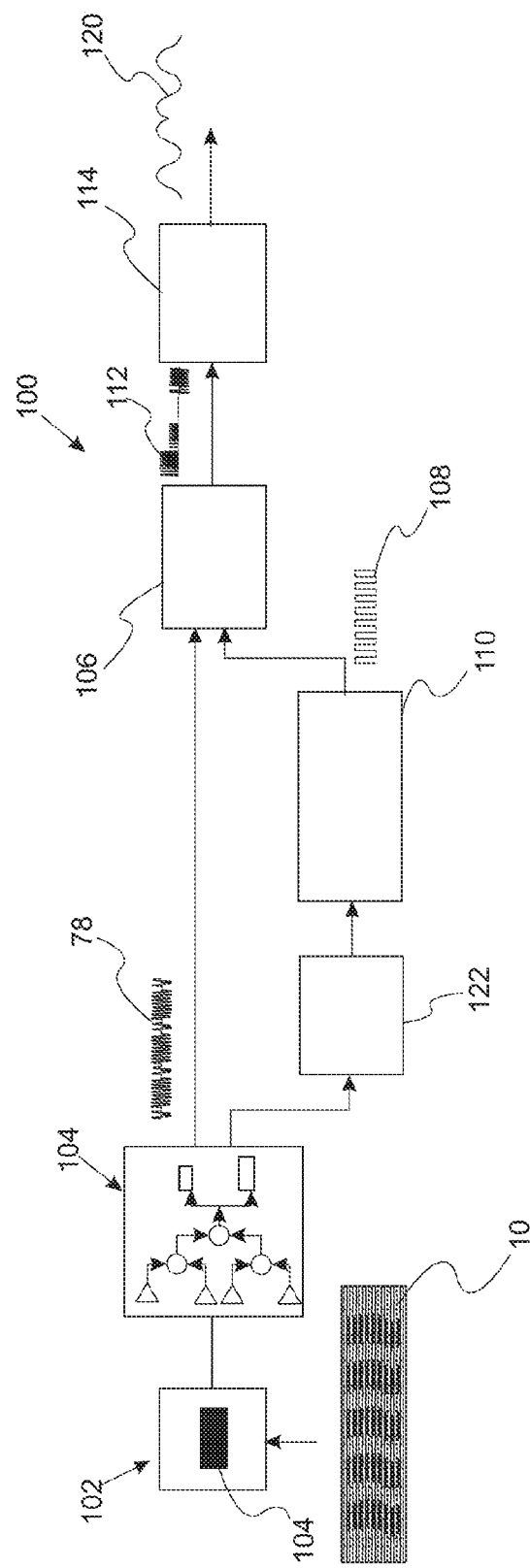
FIG. 8 provides a schematic illustration of a system for detecting a tracking error signal and a quadrature track error signal from an optical medium with wobble patterns embossed thereon.

With reference to FIG. 8, a schematic illustration of a system for producing a quadrature track error signal is provided. In particular, the system generates signals that provide directional information on the motion of optical pickup units across data tracks in optical recording media (e.g., optical tapes or disks). Optical data storage system 100 includes transducer head 102 in communication with a wobble detection system 104. Wobble detection system 104 includes optical pick up unit 22 that detects positions of the transducer head relative to lands and grooves as set forth above with respect to the descriptions of FIGS. 1-3. Optical pick up unit 22 is positioned in transducer head 102. In a refinement, the wobble detection system of FIG. 2 is used in this embodiment. Wobble detection system 104 provides direct track error signal 78 and wobble signal 80. As used herein, the term direct track error signal 78 refers to the normal prior art track error signal that is detected by the "Main Push Pull" (MPP) method or the differential push pull method. Wobble signal 80 is characterized by having a first frequency (i.e., a wobble signal frequency). In a refinement, the wobble signal frequency is from 0.5 megahertz to 10 megahertz. Typical wobble signal frequencies are about 1 megahertz. As set forth above, wobble signal 80 for a land is 180 degrees out of phase with the wobble signal for a groove with wobble signal 80 being amplitude modulated for positions intermediate between the land and the groove. More particularly, in this context, being 180 out of phase means that wobble signal peaks maxima for lands correspond to wobble signal minima for grooves and wobble signal peaks minima for lands correspond to wobble signal maxima for grooves. Synchronous multiplier 106 multiplies wobble signal 80 with square wave 108 signal derived from synchronous clock 110 having the first frequency to provide a product signal 112. In a refinement, square wave 108 has a voltage amplitude varying from 0 volts to a peak value (e.g. 1 volt). Product signal 112 is positive for a first direction of motion of transducer head 102 and negative for a second direction of motion of transducer head 102 that is opposite that of the first direction. These directions of motion are recognized as directions $d_1$ and $d_2$ from FIG. 5. Integrator 114 integrates the product signal 112 to obtain quadrature track error signal 120. Characteristically, quadrature track error signal 120 is 90 degrees out of phase with the track error signal. Quadrature track error signal (QTES) and the track error signal 78 in combination provide direction information about movement of the transducer head across data tracks as set forth below.

Optical storage system 100 also includes phase lock loop 122 which allows square wave 108 to lock onto wobble signal 80. Phase lock loop 122 receives the appropriate locking frequency from wobble signal 80. Phase lock loop 122 is phase adjustable to maximize product signal 112. The phase lock loop ensures that the square wave signal is in phase with the wobble signal.

Figure 9:
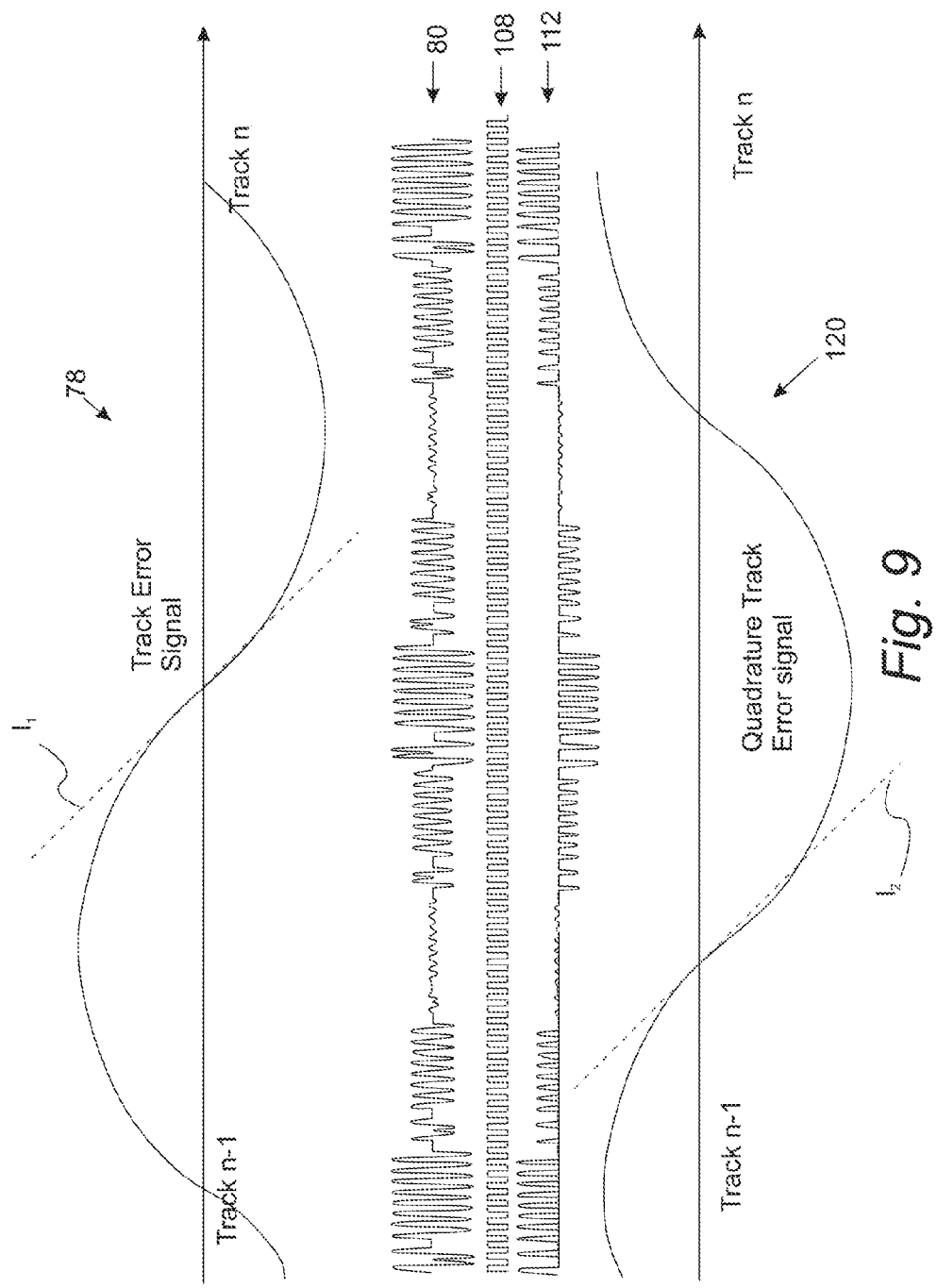
FIG. 9 provides a schematic illustration of a system for detecting a tracking error signal and a quadrature track error signal from an optical medium with wobble patterns embossed thereon.

With reference to FIGS. 9 and 10, features of the quadrature track error signal are provided. FIG. 9 provides aligned plots of direct track error signal 78, wobble signal 80, square wave signal 108, product signal 112, and quadrature track error signal 120. FIG. 10 provides a schematic of an OPU crossing multiple tracks along two opposite transverse directions with the related TES signal and quadrature track error signal. Direct track error signal 78 and quadrature track error signal 120 both independently include an oscillating pattern as the transducer head moves across tracks. For example, the quadrature track error signal and the direct track error signal may each independently be approximated by a sinusoidal function as head moves across data tracks in an optical data storage medium. In this regard, the sinusoidal functions are within 5 percent of the actual values for the quadrature track error signal and the track error signal.

In one refinement, the direct track error signal leads the quadrature track error signal for the first direction of motion $d_1$. In another refinement, the quadrature track error signal leads the direct track error signal for the second direction of motion $d_2$. It should also be observed that quadrature track error signal 120 changes such that the product signal 112 is positive for first direction of motion $d_1$ and negative for second direction of motion $d_2$ that is opposite that of the first direction. Typically, direct track error signal 80 includes a first set of regions that are approximated by linear functions $l_1$ and quadrature track error signal 12 includes a second set of regions that are approximated by linear functions $l_2$. The first set of regions that are approximated by linear functions and the second set of regions that are approximated by linear functions include non-overlapping portions with respect to displacement of the transducer head from a land or groove. Moreover, the first set of regions that are approximated by linear functions and the second set of regions that are approximated by linear functions provide complete linearization of the motion of the transducer head across the data tracks.

With reference to FIG. 11, the method implemented by the system of FIG. 8 is summarized. In step a), wobble signal 80 having a first frequency is received from a wobble detection system 104 such as the system depicted in FIG. 2. The wobble detection system includes an optical pick up unit that detects positions of a transducer head relative to lands and grooves. Wobble signal 80 for the optical pick up unit centered on a land is 180 degrees out of phase with the wobble signal for the optical pick up unit centered on a groove. Characteristically, the wobble signal is amplitude modulated for positions intermediate between the land and the groove. In step b), a direct tracking error signal 78 from the wobble detection system is received. In step c), wobble signal 80 is multiplied with a synchronous signal to about product signal 112. Product signal 112 is positive for a first direction of motion and negative for a second direction of motion that is opposite that of the first direction. In step d), product signal 112 is integrated to obtain quadrature track error signal 120. Characteristically, the quadrature track error signal is 90 degrees out of phase with the primary track error signal. The quadrature track error signal and the primary track error signal in combination and individually provide direction information about movement of the tape head across the width of the tape as set forth above. TES signal 78 and wobble signal 80 are used by recording/reading head servo system 86 to provide positioning information regarding the position of the transducer head. In particular, digital servo systems controls the dynamic operation of the OPUs by using wobble signal information to place the OPU on the correct desired data track.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for providing tracking error signals in an optical digital storage system, the optical digital storage system including an optical recording medium, a transducer head to read/write to data tracks on the optical recording medium, and a wobble detection system having an optical pick up unit to detect positions of the transducer head, the method comprising:
receiving a wobble signal from the wobble detection system to detect the positions of the transducer head along the optical recording medium;
computing a quadrature track error signal as a function of the wobble signal and a square wave signal of a synchronous clock, the square wave signal locking to the wobble signal with a phase lock loop and having a zero voltage at a minimum amplitude;
receiving a tracking error signal from the wobble detection system; and
computing movement direction information of the transducer head across the data tracks as a function of the quadrature track error signal and the tracking error signal.

2. The method of claim 1 wherein the quadrature track error signal is substantially 90 degrees out of phase with the tracking error signal.

3. The method of claim 1 wherein one of the quadrature track error signal and the tracking error signal leads the other of the quadrature track error signal and the tracking error signal for movement direction.

4. The method of claim 1 wherein at least one of the quadrature track error signal and the tracking error signal are approximated by a sinusoidal function as the transducer head moves across the data tracks.

5. The method of claim 1 wherein at least one of the quadrature track error signal and the tracking error signal includes a set of regions that are approximated by linear functions.

6. The method of claim 1 further comprising detecting a position of the transducer head relative to lands between grooves using the wobble signal from the optical pick up unit, wherein the wobble signal centered on one of the lands is substantially 180 degrees out of phase with the wobble signal centered on one of the grooves.

7. The method of claim 6 wherein the wobble signal is amplitude modulated for transducer head positions intermediate the one of the lands and the one of the grooves.

8. The method of claim 1 wherein computing the quadrature track error signal includes integrating a product of the wobble signal with the square wave signal.

9. The method of claim 8 wherein the product is positive for a first direction of motion and negative for an opposite second direction of motion.

10. The method of claim 8 further comprising adjusting the phase lock loop to maximize the product.

11. The method of claim 1 wherein the computing of the movement direction information includes detecting a discontinuity in the quadrature track error signal.

12. An optical storage system comprising:
a transducer head to read/write to data tracks on an optical recording medium;
a wobble detection system including an optical pick up unit positioned in the transducer head to transmit a wobble signal to detect positions of the transducer head relative to grooves in the optical recording medium, wherein the wobble detection system further transmits a tracking error signal;
a synchronous clock including a square wave signal having a substantially zero voltage at a minimum amplitude;
a phase lock loop to lock the wobble signal to the square wave signal; and
a processing unit to compute a quadrature track error signal as a function of the wobble signal and the square wave signal, and to compute movement direction information of the transducer head across the data tracks as a function of the quadrature track error signal and the tracking error signal.

13. The system of claim 12 wherein the processing unit computes movement direction information by detecting a discontinuity in the quadrature track error signal.

14. The system of claim 12 wherein the quadrature track error signal is substantially 90 degrees out of phase with the tracking error signal.

15. The system of claim 12 wherein one of the quadrature track error signal and the tracking error signal leads the other of the quadrature track error signal and the tracking error signal for movement direction.

16. The system of claim 12 wherein at least one of the quadrature track error signal and the tracking error signal are approximated by a sinusoidal function as the transducer head moves across the data tracks.

17. The system of claim 12 wherein at least one of the quadrature track error signal and the tracking error signal includes a set of regions that are approximated by linear functions.

18. The system of claim 12 wherein the optical pick up unit is configured to detect positions of the transducer head relative to lands between grooves using the wobble signal, wherein the wobble signal centered on one of the lands is substantially 180 degrees out of phase with the wobble signal centered on one of the grooves.

19. The system of claim 18 wherein the wobble signal is amplitude modulated for transducer head positions intermediate the one of the lands and the one of the grooves.

20. The system of claim 12 wherein the phase lock loop is adjustable to maximize a product of the wobble signal with the square wave signal, wherein the quadrature track error signal is computed by integrating the product.

* * * * *

UNITED STATES PATENT AND TRADEMARK OFFICE
CERTIFICATE OF CORRECTION

PATENT NO. : 10,079,037 B2
APPLICATION NO. : 15/600624
DATED : September 18, 2018
INVENTOR(S) : Mahnad Page 1 of 1

It is certified that error appears in the above-identified patent and that said Letters Patent is hereby corrected as shown below:

In the Specification

In Column 2, Line 38, after "media" insert -- . --.

Signed and Sealed this
Sixteenth Day of July, 2019

Andrei Iancu
*Director of the United States Patent and Trademark Office*